March 1, 1938.                J. W. PATTERSON                2,109,548
                                LIQUID SPRAYER
                            Filed Nov. 30, 1934            2 Sheets-Sheet 1

Inventor
Joseph W. Patterson

Jack Ashley
Attorney

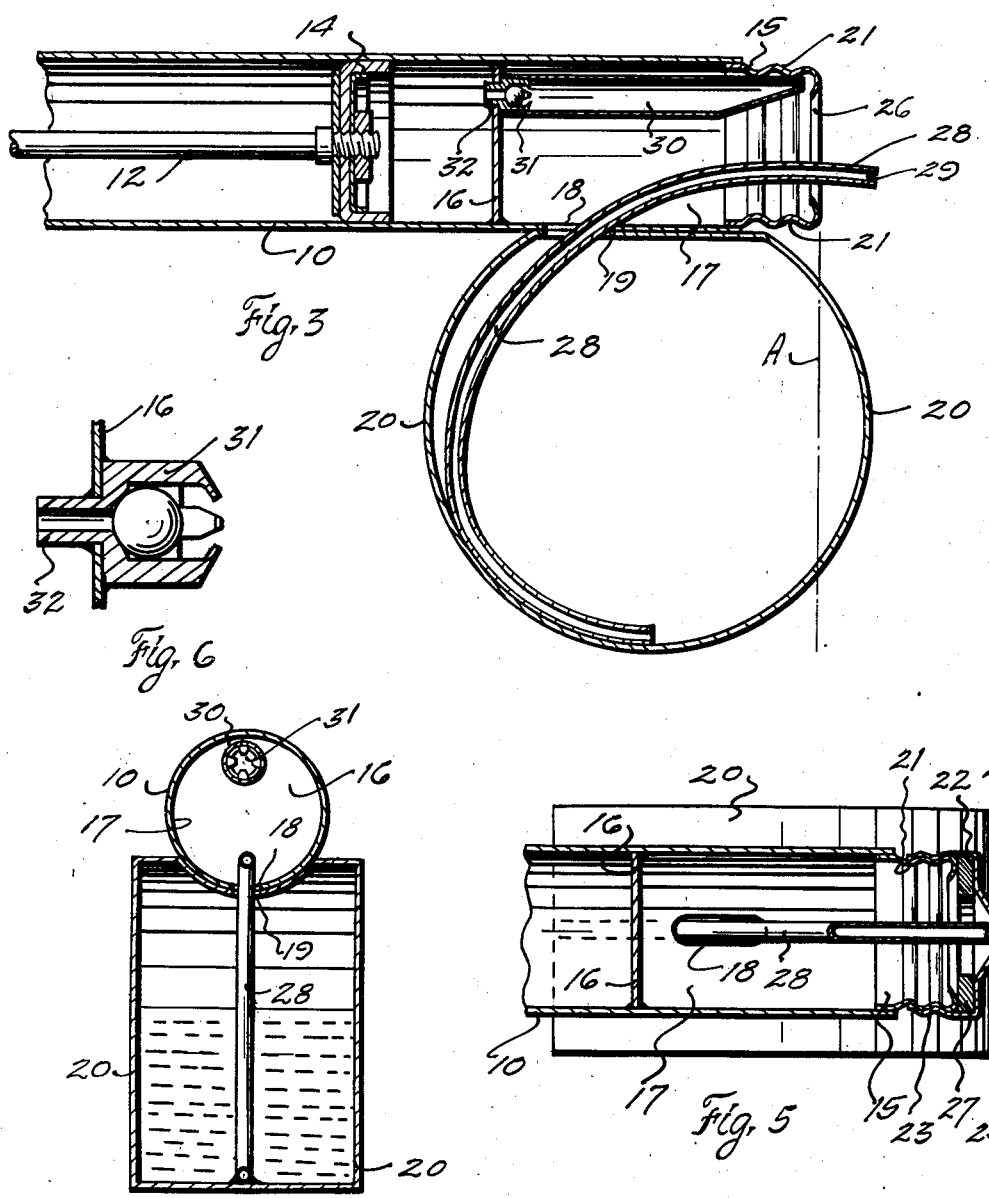

Patented Mar. 1, 1938

2,109,548

UNITED STATES PATENT OFFICE 2,109,548

LIQUID SPRAYER

Joseph W. Patterson, Tulsa, Okla., assignor to Volume Sprayer Mfg. Co., Inc., Tulsa, Okla., a corporation of Delaware Application November 30, 1934, Serial No. 755,455

17 Claims. (Cl. 299—89)

This invention relates to new and useful improvements in liquid sprayers.

One object of the invention is to provide an improved sprayer of the continuous spraying type.

A particular object of the invention is to provide a sprayer wherein the liquid eduction tube is fastened at one end in the liquid container, while its opposite or discharge end is free and co-acts with a removable nozzle, thereby making for simplicity in construction, as well as providing for more ready centering of the tip of the tube in said nozzle.

Another object of the invention is to provide a sprayer in which the liquid container is integral therewith, and a removable cap serves both as a nozzle and a closure which may be removed to fill the sprayer; the removal of the cap exposing the tip of the eduction tube, which, being fastened in place, may be easily cleaned by running a small wire therethrough.

Still another object of the invention is to provide a sprayer having an air duct therein and co-acting guard for preventing liquid reaching the check valve, either when the device is being filled or when it is being operated.

A further object of the invention is to provide a continuous liquid sprayer having a liquid container fastened to its barrel, and arranged to be filled from its discharge end so that air will be trapped in the container when the sprayer is held in filling position, thus preventing filling the container too full of liquid, and also providing sufficient air space for proper operation.

A construction designed to carry out the invention will be hereinafter described, together with other features of the invention.

Figure 1:
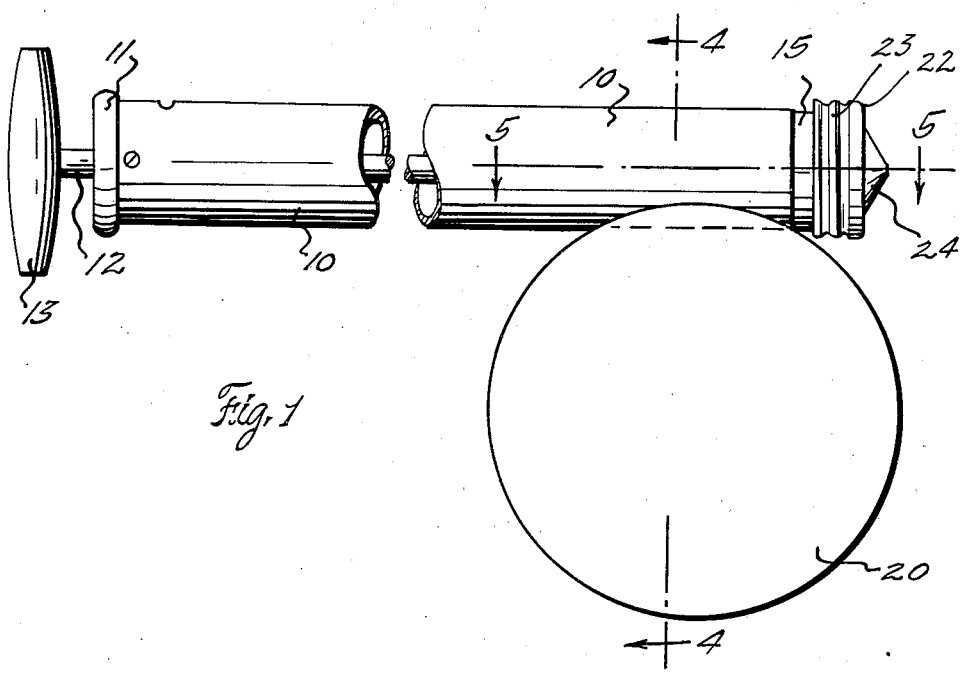
Figure 2:
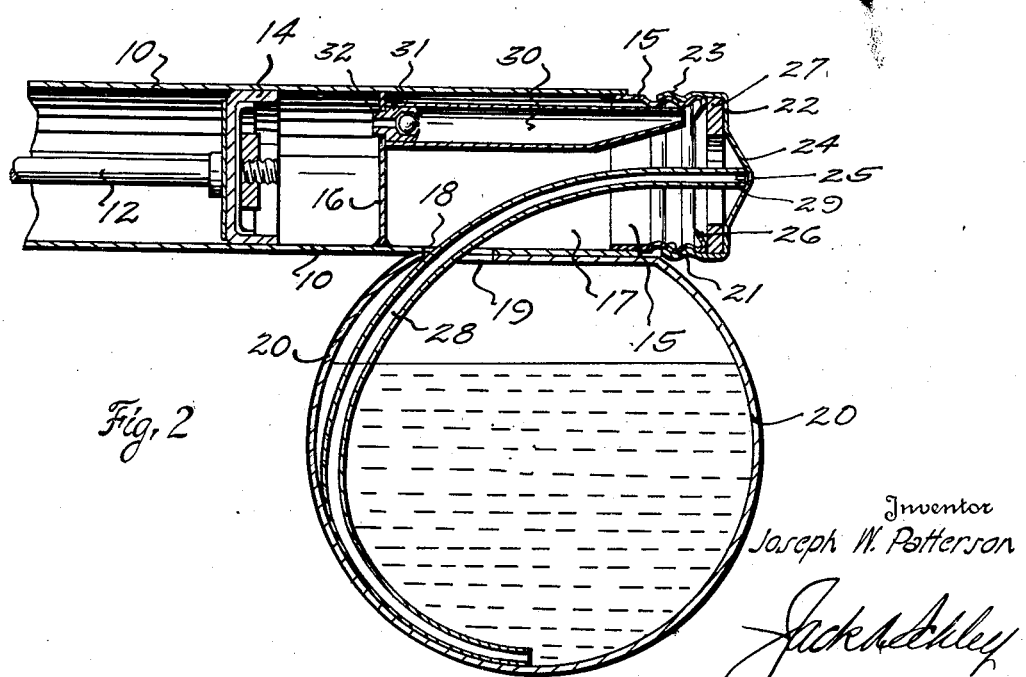

The invention will be more readily understood from a reading of the following specification and by reference to the accompanying drawings, in which an example of the invention is shown, and wherein:

Figure 1 is a side elevation of a sprayer constructed in accordance with the invention, Figure 2 is a longitudinal vertical sectional view, Figure 3 is a view similar to Figure 2, the cap being removed, whereby the spring eduction tube is released, Figure 4 is a transverse vertical sectional view taken on the line 4—4 of Figure 1, Figure 5 is a horizontal cross-sectional view taken on the line 5—5 of Figure 1, and Figure 6 is an enlarged sectional view of the check valve.

In the drawings the numeral 10 designates an elongated cylindrical pump barrel having the usual apertured plug 11 at one end, through which the plunger rod 12 slides. On the outer end of the rod a cross-handle 13 is fastened. On the inner end of the rod a flexible plunger 14 is carried. These parts may be of any suitable construction, such as is now common in the sprayer art and are subject to change, being auxiliaries to the invention.

The forward or discharge end of the barrel 10 is preferably left open, in its manufacture, so the end of a cylindrical nipple or collar 15 may be soldered or otherwise fastened therein. A transverse head or partition 16 is soldered or suitably fastened in the barrel, a short distance from the nipple, to form a pressure chamber 17 forwardly of said partition. Just forward of the partition the barrel has a longitudinally elongated opening 18, which registers with a complementary opening 19 in the cylindrical wall of a liquid container or can 20, which wall is deformed to seat the barrel therein. The can and barrel may be secured together by soldering or otherwise.

The nipple 15 is provided with screw threads 21, which may be pressed, rolled, or otherwise formed therein. The screw threads could be formed in the end of the barrel and the nipple omitted. A cap 22 provided with screw threads 23 is screwed onto the nipple. The nipple and cap are preferably made of thin metal, such as is common in this art and which lends itself to inexpensive production. The cap is deformed outwardly at its central portion to form a conical nozzle 24 having a small aperture 25 at its apex. The nipple is formed with an in-turned annular guard lip 26 and a packing washer 27 seated in the cap is held tightly against said lip, whereby an air-tight joint is provided.

A small curved eduction tube 28 passes through the openings 18 and 19 and extends through the pressure chamber 17 as well as to the bottom of the can. The lower end of the tube is curved forwardly so as to lie contiguous to the bottom of the can to which it is secured. To facilitate manufacture, the cylindrical portion of the can may be soldered to the barrel before the ends of said can are placed thereon, whereby the tube may be soldered in place.

The openings 18 and 19 are long enough to permit movement of the tube and when the cap 22 is removed, as in Figure 3, the forward end of the tube being released, said tube will spring forwardly. Thus when the cap is screwed onto the nipple the free end of the tube will be engaged by the conical nozzle 24 and guided to the center thereof, so as to register with the aperture 25. This arrangement not only assures a correct positioning of the end of the tube, but makes certain the positive holding of the end of said tube in the nozzle.

In order to admit air from the pressure chamber 17, the discharge end of the tube is formed with an opening such as a slot 29. The size of this slot may vary in accordance with the thickness of the liquid which is sprayed. If the tube should become clogged, the cap 22 may be removed and said tube cleaned by running a small piece of wire back and forth therethrough. The tube is always in place and the sprayer is much more simple than those having removable tubes.

The pressure chamber has a small air duct 30 fastened longitudinally therein. The front end of the duct is reduced so as to terminate adjacent the lip 26. When the barrel is swung to a vertical position from the position shown in Figure 3, the lip will overhang the duct and prevent the liquid, which is being poured into the chamber 17 through the nipple, from flowing into said duct. It will be noted (Figure 3) that the edge of the lip is in alinement with the chordal line A, whereby a dead air space will be formed in the can (the barrel being held vertically) when the sprayer is being filled. This prevents filling the sprayer too full.

A cylindrical check valve 31 telescopes the rear end of the air duct and has a reduced stem 32 extending through the head 16. The valve is soldered or otherwise fastened to the head so as to have an air-tight connection therewith. The valve supports the rear end of the duct and admits air thereto from the barrel in rear of said head. The front end of the duct is soldered in the nipple.

In using the sprayer the cap 22 is removed and the barrel swung to vertical position. The liquid, such as insecticide, is poured through the nipple into the chamber 17 from which it flows to the can 20 through the openings 18 and 19, until the trapped air above the line A (Figure 3) causes the nipple to be filled. The overhanging guard lip 26 prevents the liquid flowing into the duct 30. The cap 22 is next screwed onto the nipple, whereby the eduction tube 28 is depressed and its discharge end guided into the nozzle 24 so as to register with the aperture 25.

The sprayer is now ready for use and the operator, by reciprocating the plunger 14, forces air past the valve 31 into the duct 30 and thence into the pressure chamber 17. The valve prevents air passing back into the barrel and its only escape is through the openings 18 and 19 and out through the slot 29 and the aperture 25. The escape to atmosphere through the nozzle is so small in proportion to the volume forced into the chamber 17, that a pressure is soon built up, and this pressure exerted on top of the liquid forces the same through the eduction tube 28. The stream of compressed air passing through the slot 29 forces the liquid through the aperture 25, whereby a fine mist or spray is produced. This spray will be continuous and steady, so long as the pressure is provided by reciprocating the plunger.

What I claim and desire to secure by Letters Patent is:

1. A sprayer comprising, a barrel, a removable cap on one end of the barrel having a spray nozzle formed therein, an air pressure chamber in the barrel communicating with the nozzle, a receptacle secured to the barrel and communicating with the chamber, and an eduction tube extending through the chamber down into the receptacle and having an opening at its discharge end for admitting air from the chamber, the lower end of the tube being permanently fastened at the bottom of the receptacle and its discharge end engaging in the nozzle of the cap.

2. A sprayer comprising, a barrel, a removable cap on one end of the barrel having a spray nozzle formed therein, an air pressure chamber in the barrel communicating with the nozzle, a receptacle secured to the barrel and communicating with the chamber, an eduction tube extending through the chamber down into the receptacle and having an opening at its discharge end for admitting air from the chamber, the lower end of the tube being permanently fastened at the bottom of the receptacle and its discharge end engaging in the nozzle of the cap, a valve for supplying air to the chamber, and an air duct extending from the valve through the chamber to the filling end of the barrel to exclude liquid from the valve.

3. A sprayer comprising, a barrel, a removable cap on one end of the barrel having a spray nozzle formed therein, an air pressure chamber in the barrel communicating with the nozzle, a receptacle secured to the barrel and communicating with the chamber, an eduction tube extending through the chamber down into the receptacle and having an opening at its discharge end for admitting air from the chamber, the lower end of the tube being permanently fastened at the bottom of the receptacle and its discharge end engaging in the nozzle of the cap, a valve for supplying air to the chamber, an air duct extending from the valve through the chamber to the filling end of the barrel to exclude liquid from the valve, and a guard adjacent the front end of the barrel to exclude liquid from the duct when the sprayer is being filled.

4. A sprayer including, a barrel having an open end, a cap provided with a longitudinally directed conical portion closing the open end of said barrel and terminating in a nozzle opening, a receptacle secured to the barrel, said barrel and receptacle having a passageway therebetween affording communication between said barrel and receptacle, one end of the barrel provided with an air pressure chamber communicating with the nozzle and the passageway between said barrel and receptacle, means for supplying air to said air pressure chamber, said means including a check valve for building up air pressure within said chamber and nozzle, and an eduction tube provided with an opening adjacent one end for admitting air from the chamber into said tube, said tube being arranged with the end having the opening engaging in said nozzle and extending rearwardly therefrom through said passageway into said receptacle, the lower end of said tube being fastened in the receptacle, the cap being removable for filling the sprayer.

5. A sprayer comprising, a barrel having an open end, a cap provided with a longitudinally directed conical portion closing the open end of said barrel and terminating in a nozzle opening, a receptacle secured to the barrel, said barrel and receptacle having a passageway therebetween affording communication between said barrel and receptacle, one end of the barrel provided with an air pressure chamber communicating with the nozzle and the passageway between said barrel and receptacle, means for supplying air to said chamber, an eduction tube provided with an opening adjacent one end for admitting air from the chamber into said tube, said tube being arranged with the end having the opening engaging in said nozzle and extending rearwardly therefrom through said passageway into said receptacle, the lower end of said tube being fastened in the receptacle, the cap being removable for filling the sprayer, and an air duct extending forwardly in the chamber and provided with a check valve arranged to admit air from said air supply means.

6. A sprayer comprising, a barrel having an open end, a cap provided with a longitudinally directed conical portion closing the open end of said barrel and terminating in a nozzle opening, a receptacle secured to the barrel, said barrel and receptacle having a passageway therebetween affording communication between said barrel and receptacle, one end of the barrel provided with an air pressure chamber communicating with the nozzle and the passageway between said barrel and receptacle, means for supplying air to said chamber, an eduction tube provided with an opening adjacent one end for admitting air from the chamber into said tube, said tube being arranged with the end having the opening engaging in said nozzle and extending rearwardly therefrom through said passageway into said receptacle, the cap being removable for filling the sprayer, an air duct extending forwardly in the chamber, and provided with a check valve arranged to admit air from said air supply means and a guard overhanging the front end of the air duct.

7. A sprayer comprising, a barrel having an open end, a cap provided with a longitudinally directed conical portion closing the open end of said barrel and terminating in a nozzle opening, a receptacle secured to the barrel, said barrel and receptacle having a passageway therebetween affording communication between said barrel and receptacle, one end of the barrel provided with an air pressure chamber communicating with the nozzle and the passageway between said barrel and receptacle, means for supplying air to said chamber, an eduction tube provided with an opening adjacent one end for admitting air from the chamber into said tube, said tube being arranged with the end having the opening engaging in said nozzle and extending rearwardly therefrom through said passageway into said receptacle, the lower end of said tube being fastened in the rceptacle, the cap being removable for filling the sprayer, and an air duct extending forwardly in the chamber and provided with a check valve arranged to admit air from said air supply means, the valve having a boss fitting within the rear end of the duct and supporting the same.

8. A sprayer comprising, a barrel having a plunger working therein and provided with a filling opening at one end, a partition extending across the barrel intermediate its ends to form an air pressure chamber at the discharge end of said barrel, a receptacle secured to the barrel and communicating with the chamber, an eduction tube extending through the chamber into the receptacle and having its lower end permanently fastened at the bottom of the receptacle, the forward end of the tube extending into the filling opening of the barrel and having an opening for admitting air from said chamber, a cap removably mounted on the filling opening of said barrel and having a longitudinally directed nozzle receiving and supporting the forward end of said tube, and check valve means for admitting air to the chamber forced thereinto by said plunger.

9. A sprayer comprising, a barrel having a plunger working therein and provided with a filling opening at one end, a partition extending across the barrel intermediate its ends to form an air pressure chamber at the discharge end of said barrel, a receptacle secured to the barrel and communicating with the chamber, an eduction tube extending through the chamber into the receptacle and having its lower end permanently fastened at the bottom of the receptacle, the forward end of the tube extending into the filling opening of the barrel and having an opening for admitting air from said chamber, a cap removably mounted on the filling opening of said barrel and having a longitudinally directed nozzle receiving and supporting the forward end of said tube, check valve means for admitting air to the chamber forced thereinto by said plunger, and an air duct extending from the valve through the chamber to the filling opening of the barrel to exclude liquid from the valve.

10. A sprayer comprising, a barrel having a plunger working therein and provided with a filling opening at one end, a partition extending across the barrel intermediate its end to form an air pressure chamber at the discharge end of said barrel, a receptacle secured to the barrel and communicating with the chamber, an eduction tube extending through the chamber into the receptacle, the forward end of the tube extending into the filling opening of the barrel and having an opening for admitting air from said chamber, a cap removably mounted on the filling opening of said barrel and having a longitudinally directed nozzle receiving and supporting the forward end of said tube, check valve means for admitting air to the chamber forced thereinto by said plunger, an air duct extending from the valve through the chamber to the filling opening of the barrel to exclude liquid from the valve, and a guard overhanging the front end of the air duct to exclude liquid from the duct when the sprayer is being filled.

11. A sprayer comprising, a barrel having an open end, a cap provided with a longitudinally directed conical portion closing the open end of said barrel and terminating in a nozzle opening, a partition disposed within the barrel near the discharge end thereof, a receptacle secured to the barrel, said barrel and receptacle having a passageway therebetween affording communication between said barrel and receptacle, the discharge end of the barrel provided with an air pressure chamber communicating with the nozzle and the passageway between said barrel and receptacle, means for supplying air to said chamber, said means including a check valve for building up air pressure within said chamber and nozzle, an air duct extending forwardly in the chamber from the partition toward the nozzle and having its forward end reduced for preventing liquid getting to the valve, and an eduction tube provided with an opening adjacent one end for admitting air from the chamber into said tube, said tube being arranged with the end having the opening engaging in said nozzle and extending rearwardly therefrom through said passageway into said receptacle, the lower end of said tube being fastened in the receptacle, the cap being removable for filling the sprayer.

12. A sprayer comprising, a barrel having an opening, a cap provided with a longitudinally directed conical portion closing the open end of said barrel and terminating in a nozzle opening, a receptacle secured to the barrel, said barrel and receptacle having a passageway therebetween affording communication between said barrel and receptacle, the discharge end of the barrel provided with a partition and an air pressure chamber communicating with the nozzle and the passageway between said barrel and receptacle, means for supplying air to said chamber including a valve for building up air pressure within said chamber and nozzle, an air duct extending forwardly in the chamber from the partition toward the nozzle and having its forward end reduced, a guard adjacent the front end of the barrel to exclude liquid from the duct, and an eduction tube provided with an opening adjacent one end for admitting air from the chamber into said tube, said tube being arranged with the end having the opening engaging in said nozzle and extending rearwardly therefrom through said passageway into said receptacle, the lower end of said tube being fastened in the receptacle, the cap being removable for filling the sprayer.

13. A sprayer comprising, a barrel having an open end, a cap provided with a longitudinally directed conical portion and screwed on the open end of said barrel and terminating in a nozzle opening, a receptacle secured to the barrel, said barrel and receptacle having a passageway therebetween affording communication between the barrel and receptacle, the discharge end of the barrel provided with an air pressure chamber communicating with the nozzle and the passageway between said barrel and receptacle, means for supplying air to said chamber, said means including a check valve for building up air pressure within said chamber and nozzle, and an eduction tube fastened in said sprayer and provided with an opening adjacent one end for admitting air from the chamber into said tube, said tube being arranged with the end having the opening disposed in the cap and engaging the nozzle and extending rearwardly therefrom through said passageway into said receptacle, the cap being removable for filling the sprayer.

14. A sprayer comprising, a barrel, a removable cap screwed on one end of the barrel and having a spray nozzle formed therein, said barrel having an air pressure chamber therein at its cap end communicating with the nozzle, means working in the barrel for supplying air to the chamber, a receptacle secured to the barrel and communicating with the chamber, and an eduction tube extending through the chamber down into the receptacle and having an opening at its discharge end for admitting air from the chamber, said tube being held with its lower end at the bottom of the receptacle and its discharge end engaging in the nozzle of the cap, the cap being removable to fill the receptacle and the tube being held in the sprayer when the cap is removed.

15. A sprayer comprising, a barrel, a removable cap on one end of the barrel and having a spray nozzle formed therein, said barrel having an air pressure chamber therein communicating with the nozzle, means working in the barrel for supplying air to the chamber, a receptacle secured to the barrel and communicating with the chamber, an eduction tube extending through the chamber down into the receptacle and having an opening at its discharge end for admitting air from the chamber, said tube being held with its lower end at the bottom of the receptacle and its discharge end engaging in the nozzle of the cap, and a check valve for supplying air to the pressure chamber, the cap being removable for filling the receptacle.

16. A sprayer comprising, a barrel having an air pressure chamber at one end portion and open at the forward end of said chamber, the barrel rearwardly of said chamber constituting the cylinder of a piston pump, a cap closing the open end of said barrel and provided with an outwardly directed portion terminating in a nozzle opening, a receptacle secured to the barrel, there being a passageway between said chamber and said receptacle affording communication therebetween, means in the cylinder portion of the barrel for supplying air to the air chamber, a check valve between the cylinder portion and the air chamber for admitting air to said chamber from said cylinder portion, whereby an air pressure is built up in said chamber, and an eduction tube extending through the passageway into both the air chamber and the receptacle and having its forward end engaging in the nozzle of the cap and its rearward end extending into the receptacle, said tube having an opening in its forward end for admitting air from the air chamber, the cap being removable from the barrel.

17. In a liquid spray device, a closed liquid container, a pump cylinder attached thereto, a partition in the pump cylinder dividing the same into two chambers, a piston movable in one chamber, the other chamber being in communication with the container and open at its outer end and having an inwardly directed flange at the outer end, a combined unitary closure cap and nozzle removably attached to the open end of the pump cylinder whereby fluid may be introduced into the container through the open end of the cylinder, a fluid delivery tube extending from the container to the nozzle portion of the cap and a check valve carried by the partition including an air tube projecting toward the open end of the pump cylinder and having an open end disposed adjacent a side wall of the pump cylinder in proximity of the cylinder flange to prevent the passage of liquid into the air tube and piston chamber of the pump cylinder when the container is being filled through the open end of the pump cylinder.

JOSEPH W. PATTERSON.